US008711969B2

(12) United States Patent
Zhu et al.

(10) Patent No.: US 8,711,969 B2
(45) Date of Patent: Apr. 29, 2014

(54) GLOBAL CODEBOOK FOR COORDINATED MULTI-POINT PROCESSING

(75) Inventors: Chenxi Zhu, Fairfax, VA (US); Huy-Dung Han, Davis, CA (US)

(73) Assignee: Fujitsu Limited, Kawasaki-shi (JP)

( * ) Notice: Subject to any disclaimer, the term of this patent is extended or adjusted under 35 U.S.C. 154(b) by 29 days.

(21) Appl. No.: 13/485,029

(22) Filed: May 31, 2012

(65) Prior Publication Data
US 2013/0121439 A1 May 16, 2013

Related U.S. Application Data

(60) Provisional application No. 61/558,860, filed on Nov. 11, 2011.

(51) Int. Cl.
*H04B 7/00* (2006.01)
*H04L 1/00* (2006.01)

(52) U.S. Cl.
USPC .......................... 375/267; 375/259; 375/260

(58) Field of Classification Search
USPC ........................................................ 375/267
See application file for complete search history.

(56) References Cited

U.S. PATENT DOCUMENTS

| | | | |
|---|---|---|---|
| 2008/0080449 A1* | 4/2008 | Huang et al. | 370/342 |
| 2009/0046569 A1* | 2/2009 | Chen et al. | 370/203 |
| 2009/0086840 A1* | 4/2009 | Jung et al. | 375/262 |
| 2012/0177097 A1* | 7/2012 | Lee et al. | 375/227 |
| 2012/0281776 A1* | 11/2012 | Khojastepour | 375/260 |
| 2013/0058205 A1* | 3/2013 | Tang | 370/203 |
| 2013/0064315 A1* | 3/2013 | Heath et al. | 375/260 |

OTHER PUBLICATIONS

Wikipedia; "Lloyd's algorithm"; www.wikipedia.org; pp. 2, May 23, 2012.
Wikipedia; "Precoding"; www.wikipedia.org; pp. 7, May 20, 2012.
Wikipedia; "Mimo"; www.wikipedia.org; pp. 5, May 20, 2012.
Wikipedia; "Singular value decomposition"; www.wikipedia.org; pp. 12, May 23, 2012.
Wikipedia; "Voronoi diagram"; www.wikipedia.org; pp. 9, May 23, 2012.
3G and 4G Wireless Blog; "Coordinated Multi-Point (CoMP) transmission and reception"; www.3g4g.blogspot.com ; pp. 4, May 20, 2012.
3G Americas; "Mimo Transmission Schemes for LTE and HSP Networks"; pp. 50, Jun. 2009.

* cited by examiner

*Primary Examiner* — Erin File
(74) *Attorney, Agent, or Firm* — Baker Botts L.L.P.

(57) ABSTRACT

In accordance with one or more embodiments of the present disclosure a method for generating a codebook comprises generating a plurality of wireless communication channel representations. The method further comprises generating a precoding matrix for each of the plurality of wireless communication channel representations. The method additionally comprises performing a clustering operation on the precoding matrices to determine a plurality of centroids associated with the precoding matrices. Also the method includes determining codewords based on the centroids and generating a codebook based on the codewords.

18 Claims, 3 Drawing Sheets

FIG. 4

GLOBAL CODEBOOK FOR COORDINATED MULTI-POINT PROCESSING

RELATED APPLICATION

This application claims benefit under 35 U.S.C. §119(e) of U.S. Provisional Application Ser. No. 61/558,860, entitled "DESIGN OF GLOBAL CODEBOOK FOR LONG TERM EVOLUTION-ADVANCED COORDINATED MULTI-POINT PROCESSING," filed Nov. 11, 2011, the entire content of which is incorporated herein by reference.

TECHNICAL FIELD

The present invention relates generally to communication networks and, more particularly, to wireless communication networks.

BACKGROUND

Wireless communications systems are used in a variety of telecommunications systems, television, radio and other media systems, data communication networks, and other systems to convey information between remote points using wireless transmitters and wireless receivers. A transmitter is an electronic device which, usually with the aid of an antenna, propagates an electromagnetic signal modulated with information such as radio, television, or other telecommunications. A receiver is an electronic device which receives and a wireless electromagnetic signal and processes the information modulated thereon. A transmitter and receiver may be combined into a single device called a transceiver.

Long-Term Evolution-Advanced (LTE-A) is a popular standard for fourth-generation (4G) wireless technology. The current version of the LTE-A standard is Release 11 (Rel. 11), and a particular feature of Rel. 11 is Multiple-input/multiple output (MIMO) transmission where multiple antennas are used for transmitting and receiving wireless signals transmitted in streams of bits known as symbols. Coordinated Multi-point Processing (CoMP) may be used to coordinate and combine the transmission of signals used in MIMO transmission. Down link (DL) CoMP is a type of MIMO transmission in which a plurality of transmission sites (e.g., base stations, remote radio heads (RRHs), etc.), work together to jointly transmit wireless signals to one or more receive antennas located on a user terminal. Determining efficient signal transmission among the multiple transmission sites to an endpoint may improve the communication of information via a wireless system.

SUMMARY OF THE DISCLOSURE

In accordance with one or more embodiments of the present disclosure a method for generating a codebook comprises generating a plurality of wireless communication channel representations. The method further comprises generating a precoding matrix for each of the plurality of wireless communication channel representations. The method additionally comprises performing a clustering operation on the precoding matrices to determine a plurality of centroids associated with the precoding matrices. Also the method includes determining codewords based on the centroids and generating a codebook based on the codewords.

BRIEF DESCRIPTION OF THE DRAWINGS

Embodiments of the present disclosure are made by way of example and are not limited to the following figures in which.

DETAILED DESCRIPTION

Embodiments and their advantages may be understood by referring to FIGS. 1-4 of the drawings, like numerals being used for like and corresponding parts of the various drawings.

Figure 1:
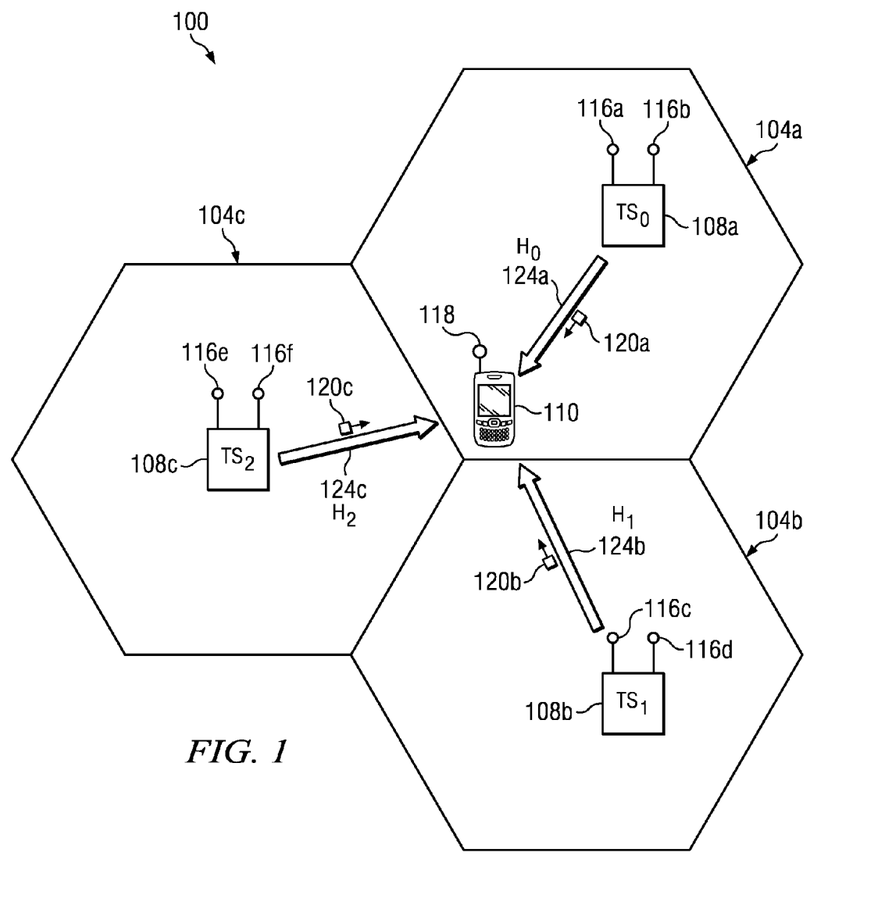
FIG. 1 depicts an example antenna system that performs beamforming from multiple transmission sites.

FIG. 1 depicts an example antenna system 100 that performs beamforming from multiple transmission sites 108. Antenna system 100 includes transmission sites 108 that communicate with one or more endpoints 110 via antenna ports 116. Antenna system 100 provides wireless coverage for any suitable number of endpoints 110 over a geographic area, such as cell 104. For example, a transmission site 108 may be used to provide wireless coverage for an entire building, a city block, a campus, or any other area. Cell 104 may have any suitable shape, such as the honeycomb-like shape depicted in FIG. 1.

As detailed below, system 100 may allow for Multiple-input/multiple output (MIMO) transmission where multiple antennas are used for transmitting and receiving wireless signals. Additionally, system 100 may be configured to perform Coordinated Multi-point Processing (CoMP) to coordinate and combine the transmission of signals used in MIMO transmission. The CoMP processing may perform down link (DL) CoMP transmission in which multiple transmission sites 108 jointly communicate with endpoint 110. The joint DL transmission may be facilitated through the use of a codebook. In accordance with the present disclosure, a global codebook may be generated by using a data mining and clustering scheme. Such a scheme may allow for the selection of codewords for the codebook to improve joint DL transmission from transmission sites 108 to an endpoint 110, as described in detail below with respect to FIG. 3.

As used herein, "transmission site" may refer to a base station (also known as a Radio Element Control, Evolved Node B's (eNBs) or a Baseband Unit) or a remote transmission site (also known as a Radio Element or a Remote Radio Head (RRH)). For example, transmission sites 108 may each be base stations. As another example, transmission site 108a may be a base station and transmission sites 108b and 108c may be remote transmission sites. In certain situations, a transmission site 108 that is a remote transmission site may function as an extension of a transmission site 108 that is a base station. For example, the remote transmission site may send wireless signals to endpoint 110 that are similar to wireless signals that would be sent by the base station to the endpoint if endpoint 110 were located close to the base station.

Transmission site 108 may include any combination of hardware, software embedded in a computer readable medium, and/or encoded logic incorporated in hardware or otherwise stored (e.g., firmware) to implement any number of communication protocols that allow for wired or wireless exchange of information in antenna system 100. Transmission sites 108 may be operable to send control signals and data traffic to endpoints 110. A transmission site 108 may also be coupled to other transmission sites 108 via one or more wired connections. These wired connections may comprise any suitable material, such as optical fiber. Transmission sites 108 may use any suitable technologies or protocols (e.g., Common Public Radio Interface (CPRI)) to communicate with each other.

Transmission sites 108 may communicate with endpoint 110 using wireless communication via one or more antenna ports 116. For example, transmission site 108a may communicate with endpoint 110 via antenna ports 116a and 116b. Transmission sites 108 may communicate with endpoint 110 using any of a variety of different wireless technologies, including, but not limited to, orthogonal frequency division multiple access (OFDMA) and the long term evolution-advanced (LTE-A) protocol as defined in the 3GPP Release 11 or beyond. In some embodiments of the present disclosure, a transmission site 108a may coordinate with one more other transmission sites 108 to jointly communicate with endpoint 110. In such embodiments, transmission sites 108 may coordinate with each other to communicate with endpoint 110 using a MIMO transmission scheme where multiple transmitting antenna ports 116 are placed at different transmission sites 108, while one or more receiving antenna ports 118 are located at the endpoint 110.

For example, transmission sites 108a and 108b may communicate with endpoint 110 using a DL CoMP MIMO transmission as defined in 3rd Generation Partnership Project (3GPP) Release 11 or beyond. During such a MIMO transmission, transmission site 108a may wirelessly communicate a portion of a data stream through antenna ports 116a and 116b and communicate another portion of the data stream through a wired connection to transmission site 108b. Transmission site 108b may then send at least a portion of the data stream to endpoint 110 via one or more wireless connections between antenna ports 116c and 116d and one or more antenna ports 118 of endpoint 110. Endpoint 110 may then combine the multiple signals received from transmission sites 108a and 108b into a single communication.

Although not shown in the embodiment depicted, transmission sites 108 may also be coupled to any network or combination of networks capable of transmitting signals, data, and/or messages, including signals, data, or messages transmitted through WebPages, e-mail, text chat, voice over IP (VoIP), and instant messaging in order to provide services and data to endpoints 110. For example, transmission site 108a may be coupled to one or more LANs, WANs, MANs, PSTNs, WiMAX networks, global distributed networks such as the Internet, or any other form of wireless or wired networking. In particular embodiments, transmission site 108a also communicates with a base station controller that facilitates handoffs between cells 104 and provides other functions.

Endpoint 110 may comprise any type of wireless device able to send and receive data and/or signals to and from transmission site 108a directly and/or via one or more other transmission sites 108. Some examples of endpoints 110 include desktop computers, PDAs, cell phones, laptops, and/or VoIP phones. Endpoints 110 may provide data or network services to a user through any combination of hardware, software embedded in a computer readable medium, and/or encoded logic incorporated in hardware or otherwise stored (e.g., firmware). Endpoints 110 may also include unattended or automated systems, gateways, other intermediate components or other devices that may send or receive data and/or signals.

Various types of information may be sent to or from endpoint 110. As an example, a transmission site 108 may send data traffic and control traffic to endpoint 110. Data traffic may be distinguished from control traffic that is used to setup and maintain a connection between one or more transmission sites 108 and endpoint 110. For example and not by way of limitation, data traffic may include information that transmission site 108 receives from a network coupled to the transmission site 108 (such as the Internet) or from another endpoint 110 located in the same cell 104 or a different cell. In a particular embodiment, data traffic is sent to endpoint 110 via a physical downlink shared channel (PDSCH) as defined in the LTE-A protocol. In such embodiments, demodulation reference signals (DM-RS) as defined in the LTE-A protocol may be sent from the physical antenna ports 116 of the transmission sites 108 and used to extract the relevant data traffic from the PDSCH.

Transmission sites 108 may also send control traffic to endpoint 110. In particular embodiments, these control messages are transmitted by a single transmission site 108 or jointly by multiple transmission sites 108. The control messages may include information (e.g., scheduling or demodulation information) that allows endpoint 110 to extract relevant data traffic from transmissions sent from the transmission sites 108. In particular embodiments, these control messages conform to the LTE-A standard. For example, the control messages may include cell-specific reference signals (CRS) such as primary synchronization signal (PSS), secondary synchronization signal (SSS), physical broadcast channel (PBCH), and/or physical downlink control channel (PDCCH) reference signals.

In particular embodiments, transmission sites 108 transmit control signals known as a channel reference signals 120. A channel reference signal 120 may include a sequence of values, such as a pseudo-random sequence. As an example, a channel reference signal 120 may be a channel state information reference signal (CSI-RS) as defined in LTE-A. In particular embodiments, each antenna port 116 of a particular transmission site 108 transmits the same channel reference signal (e.g., a signal with the same sequence). The antenna ports 116 of each transmission site 108 may transmit one or more channel reference signals that are distinguishable from the channel reference signals transmitted by the antenna ports 116 of each other transmission site 108. As an example, the channel reference signal 120a transmitted by transmission site 108a may be orthogonal in time, frequency, or code (OCC) domain, or any combination thereof to the channel reference signals 120b and 120c transmitted by transmission sites 108b and 108c respectively. Accordingly, endpoint 110 may be able to determine which transmission site 108 is transmitting a particular channel reference signal 124.

Endpoint 110 may analyze a received channel reference signal 120 to determine one or more characteristics of the channel 124 ($H_k$) between the transmission site 108 that sent the channel reference signal 120 and the endpoint 110. For example, endpoint 110 may calculate a frequency response of a channel 124 based on a received channel reference signal 120 (this may be referred to as estimating the channel). When wireless signals are sent from transmission site 108 to endpoint 110, they may take many directions (resulting in multipath fading) and may be reflected (e.g., by buildings or cars) or obstructed by objects such as trees. A channel 124 is a composite representation of the various paths (and associated path loss) that wireless signals sent from transmission site 108 to endpoint 110 may take.

Due to the differences in paths between transmission sites 108 and endpoint 110, the channels 124 from different transmission sites 108 to endpoint 110 (e.g., channels 124a (also represented by channel coefficient $H_0$) and 124b (also represented by channel coefficient $H_1$) may be uncorrelated with respect to amplitude and phase, resulting in different path loss between the channels. In contrast, the elements of a channel matrix (i.e., the constituent parts of the channel 124 that each correspond to a single antenna port 116 of the same transmission site 108 and a single antenna port 118 of endpoint 110) between a transmission site 108 and an endpoint 110 are usually correlated with respect to amplitude and phase due to similarities in their paths to endpoint 110.

During joint downlink communication (e.g., DL CoMP transmission) between endpoint 110 and a plurality of transmission sites 108, the overall transmission path between endpoint 110 and the plurality of transmission sites 108 may be referred to as a "composite" channel that includes the respective channels 124. For example, during joint communication between endpoint 110 and transmission sites 108*a* and 108*b*, a composite channel (H) may include channel 124*a* ($H_0$) and channel 124*b* ($H_1$) and may be expressed as H=[$H_0$ $H_1$]. Accordingly, during joint communication a composite channel including uncorrelated channels 124 (e.g., composite channel H comprising $H_0$ and $H_1$) may be analyzed (estimated).

To improve the transmission over a channel 124 (e.g., to help compensate for path loss, or improve the capacity of a channel 124), a transmission site 108 may apply a function known as a precoding matrix ($W_k$) to data sent from the transmission site 108 to endpoint 110. The application of the precoding matrix to data transmitted from a transmission site 108 may be analogous to changing the channel characteristics.

A precoding matrix for a particular channel may be determined by taking the right singular vector (rsv) of the channel (as indicated by the channel coefficient) which may be determined by taking the singular value decomposition of the channel (as indicated by the channel coefficient). For example, an ideal precoding matrix ($W_0$) for channel 124*a* ($H_0$) may be determined by taking the right singular vector of channel 124*a* ($H_0$) and may be expressed as the following function:

$$W_0 = rsv([H_0])$$

A composite precoding matrix may also be determined for a composite channel including a plurality of uncorrelated channels. For example, a composite precoding matrix (W) for a composite channel H comprising channels 124*a* ($H_0$) and 124*b* ($H_1$) may be determined by taking the right singular value of H as expressed by the following function:

$$W = rsv([H]) = rsv([H_0 H_1])$$

Composite precoding matrix W may include two parts ($W_0$ and $W_1$) that each correspond with channels 124*a* ($H_0$) and 124*b* ($H_1$), respectively. Accordingly, composite precoding matrix W may be expressed as $$W = \begin{bmatrix} W_0 \\ W_1 \end{bmatrix}.$$

When a channel 124 has been analyzed by endpoint 110, (e.g., estimated), endpoint 110 may determine a precoding matrix ($W_k$) for the channel 124. For example, endpoint 110 may estimate channel 124*a* ($H_0$) from transmission site 108*a* and may determine a precoding matrix ($W_0$) for channel 124*a*. In accordance with some embodiments of the present disclosure, during a joint downlink communication, endpoint 110 may analyze a composite channel that includes uncorrelated channels Endpoint 110 may then determine a precoding matrix for the composite channel that includes precoding matrices associated with each channel. For example, for a composite channel (H) that includes channel 124*a* ($H_0$) and channel 124*b* ($H_1$), endpoint 110 may determine a composite precoding matrix (W) that includes the elements of a precoding matrix ($W_0$) associated with channel 124*a* ($H_0$) and elements of a precoding matrix ($W_1$) associated with channel 124*b* ($H_1$), as described above. In particular embodiments, the composite precoding matrix for the composite channel may be selected as a codeword from a predefined codebook (CBK) generated in accordance with the present disclosure, as detailed below with respect to FIG. 3.

Upon determining an applicable precoding matrix, endpoint 110 may communicate the determined precoding matrix to the transmitting transmission site(s) 108. In some embodiments, transmission sites 108 may include the predefined codebook such that endpoint 110 may transmit an indicator of which codeword (i.e., precoding matrix) included in the codebook to use to the applicable transmission site 108. In some embodiments, endpoint 110 may transmit the indicator on the overhead of a feedback channel between endpoint 110 and the applicable transmission site 108. The precoding matrix may help compensate for path loss and/or other channel effects. Therefore, a transmission site 108 may apply the precoding matrix indicated by the endpoint 110 to improve communications over the associated channel 124 between the transmission site 108 and endpoint 110.

As used herein, an effective channel may be defined as the frequency response of data that is precoded (i.e., a precoding matrix is applied to the data) and then sent across a channel 124 to the endpoint 110. Thus, the effective channel is the product in the frequency domain of the corresponding channel 124 ($H_k$) and the precoding matrix ($W_k$) applied to data sent through the corresponding channel 124.

According to some embodiments of the present disclosure, during a joint DL transmission, endpoint 110 may determine a composite precoding matrix (W) associated with a composite channel (H), as described above, and may communicate the composite precoding matrix (W) to the applicable transmission sites 108. The transmission sites 108 may then determine which elements of the composite precoding matrix to apply to the corresponding channel 124.

For example, endpoint 110 may communicate a composite precoding matrix (W) that includes the elements of a precoding matrix ($W_0$) associated with channel 124*a* ($H_0$) and elements of a precoding matrix ($W_1$) associated with channel 124*b* ($H_1$) to transmission sites 108*a* and 108*b* jointly performing a DL transmission with endpoint 110. Transmission site 108*a* may apply the elements of precoding matrix ($W_0$) included in the composite precoding matrix (W) to channel 124*a* ($H_0$). Additionally, transmission site 108*b* may apply the elements of precoding matrix ($W_1$) included in the composite precoding matrix (W) to channel 124*b* ($H_1$). In some embodiments, transmission sites 108*a* and 108*b* may include a codebook that includes a plurality of composite precoding matrices (W) and may select the applicable precoding matrix based on indicators communicated by endpoint 110. As mentioned above, the codebook that includes composite precoding matrices for joint DL transmission may be generated in accordance to embodiments of the present disclosure, as detailed below. Therefore, transmission sites 108*a* and 108*b* may apply a desired precoding matrix ($W_0$ and $W_1$, respectively) to improve communications via channels 124*a* ($H_0$) and 124*b* ($H_1$), respectively.

Modifications, additions, or omissions may be made to FIG. 1 without departing from the scope of the present disclosure. For example, antenna network 100 may be configured to support any number of endpoints 110. Additionally, in some instances joint DL transmission may be performed with more than two transmission sites 108. Further, the number of antenna ports 116 associated with transmission sites 108 may vary depending on particular networks. Also, the number of antennas associated with an endpoint 110 may vary depending on the type of endpoint.

Figure 2:
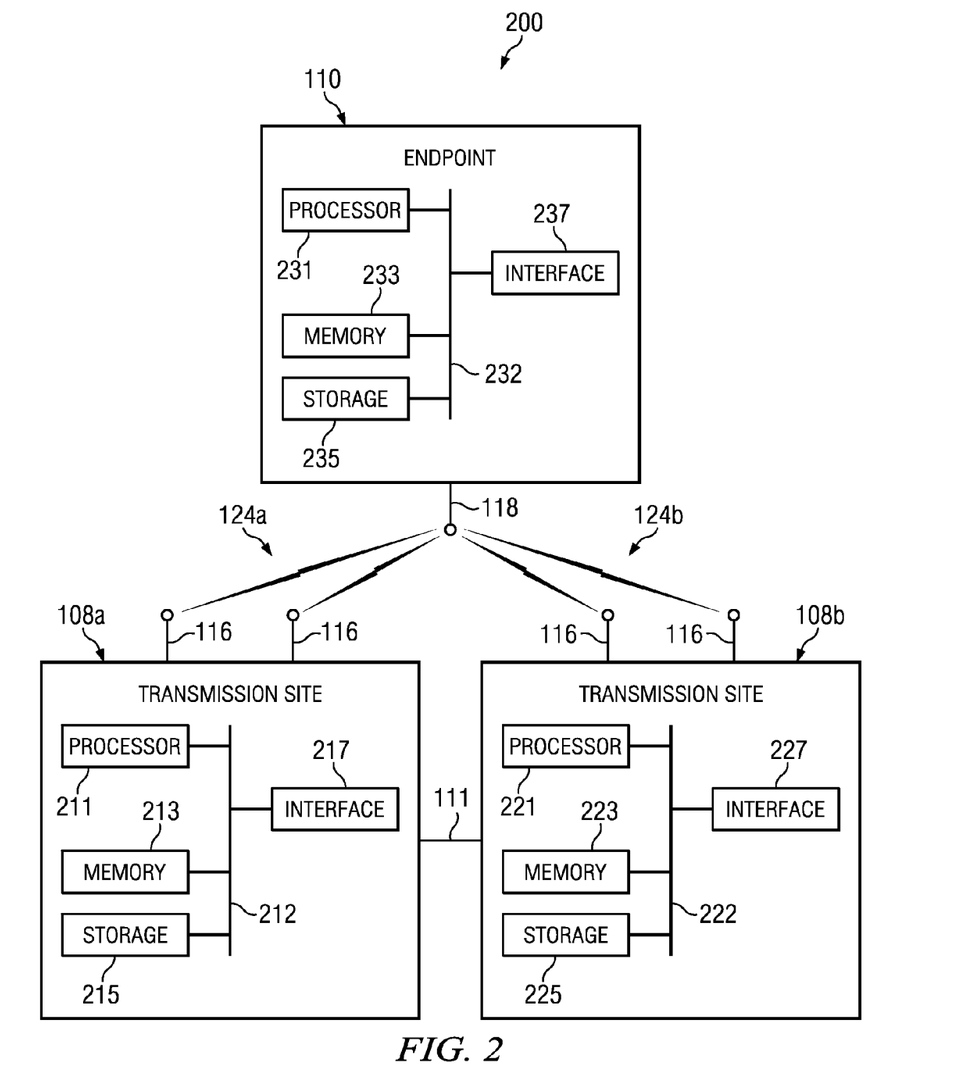
FIG. 2 depicts example computing systems that may facilitate the operations of various components of FIG. 1.

FIG. 2 depicts example computing systems that may facilitate the operations of various components of FIG. 1. FIG. 2 includes an example antenna system 200 with two example transmission sites 108 and an example endpoint 110. Antenna system 200 may correspond to at least a portion of antenna system 100 of FIG. 1. Transmission sites 108 and endpoint 110 may each include one or more portions of one or more computer systems. In particular embodiments, one or more of these computer systems may perform one or more steps of one or more methods described or illustrated herein. In particular embodiments, one or more computer systems may provide functionality described or illustrated herein. In particular embodiments, encoded software running on one or more computer systems may perform one or more steps of one or more methods described or illustrated herein or provide functionality described or illustrated herein.

The components of a transmission site 108 and an endpoint 110 may comprise any suitable physical form, configuration, number, type and/or layout. As an example, and not by way of limitation, transmission site 108 and/or endpoint 110 may comprise an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, transmission site 108 and/or endpoint 110 may include one or more computer systems; be unitary or distributed; span multiple locations; span multiple machines; or reside in a cloud, which may include one or more cloud components in one or more networks.

In the depicted embodiment, transmission sites 108*a* and 108*b* and endpoint 110 each include their own respective processors 211, 221, and 231; memory 213, 223, and 233; storage 215, 225, and 235; interfaces 217, 227, and 237; and buses 212, 222, and 232. Although a particular antenna system is depicted having a particular number of particular components in a particular arrangement, this disclosure contemplates any suitable antenna system 200 having any suitable number of any suitable components in any suitable arrangement. For simplicity, similar components of transmission sites 108 and endpoint 110 will be discussed together. However, it is not necessary for these devices to have the same components, or the same type of components. For example, processor 211 may be a general purpose microprocessor and processor 231 may be an application specific integrated circuit (ASIC).

Processors 211, 221 and 231 may be a microprocessor, controller, or any other suitable computing device, resource, or combination of hardware, software and/or encoded logic operable to provide, either alone or in conjunction with other components, (e.g., memory 213, 223, and 233, respectively) wireless networking functionality. Such functionality may include providing various wireless features discussed herein. For example, processor 231 may be configured to analyze channels between endpoint 110 and transmission sites 108*a* and 108*b* (e.g., channels 124*a* and 124*b*, respectively, of FIG. 1) and determine an applicable precoding matrix based on the analysis. In some embodiments, processor 231 may determine the applicable precoding matrix based on a codebook generated according to the present disclosure and stored in storage 235 and/or memory 233.

Further, processors 211 and 221 of transmission sites 108*a* and 108*b*, respectively, may be configured to direct the application of a specific precoding matrix indicated from endpoint 110 to signals communicated to endpoint 110 via channels 124*a* and 124*b*, respectively. In some embodiments, processors 211 and 221 may retrieve the applicable precoding matrix from a codebook generated according to the present disclosure and stored in storage 215 and 225, respectively, and/or stored in memory 213 and 223 respectively.

In particular embodiments, processors 211, 221, and 231 may include hardware for executing instructions, such as those making up a computer program. As an example and not by way of limitation, to execute instructions, processor 211, 221, and 231 may retrieve (or fetch) instructions from an internal register, an internal cache, memory 213, 223, or 233, respectively, or storage 215, 225 or 235 respectively; decode and execute them; and then write one or more results to an internal register, an internal cache, memory 213, 223, or 233, respectively, or storage 215, 225, or 235 respectively.

In particular embodiments, processors 211, 221, and 231 may include one or more internal caches for data, instructions, or addresses. This disclosure contemplates processors 211, 221, and 231 including any suitable number of any suitable internal caches, where appropriate. As an example and not by way of limitation, processors 211, 221, and 231 may include one or more instruction caches, one or more data caches, and one or more translation lookaside buffers (TLBs). Instructions in the instruction caches may be copies of instructions in memory 213, 223, or 233, respectively, or storage 215, 225, or 235, respectively, and the instruction caches may speed up retrieval of those instructions by processor 211, 221, or 231, respectively. Data in the data caches may be copies of data in memory 213, 223, or 233, respectively, or storage 215, 225, or 235, respectively, for instructions executing at processor 211, 221, or 231, respectively, to operate on; the results of previous instructions executed at processor 211, 221, or 231 for access by subsequent instructions executing at processor 211, 221, or 231, or for writing to memory 213, 223, or 233, respectively, or storage 215, 225, or 235, respectively; or other suitable data. The data caches may speed up read or write operations by processor 211, 221, or 231. The TLBs may speed up virtual-address translations for processor 211, 221, or 231. In particular embodiments, processors 211, 221, and 231 may include one or more internal registers for data, instructions, or addresses. Depending on the embodiment, processors 211, 221, and 231 may include any suitable number of any suitable internal registers, where appropriate. Where appropriate, processors 211, 221, and 231 may include one or more arithmetic logic units (ALUs); be a multi-core processor; include one or more processors 211; or any other suitable processor.

Memory 213, 223, or 233 may be any form of volatile or non-volatile memory including, without limitation, magnetic media, optical media, random access memory (RAM), read-only memory (ROM), flash memory, removable media, or any other suitable local or remote memory component or components. In particular embodiments, memory 213, 223, or 233 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 213, 223, or 233 may include one or more memories 213, 223, or 233, respectively, where appropriate. Memory 213, 223, or 233 may store any suitable data or information utilized by transmission site 108a, transmission site 108b, or endpoint 110, respectively, including software embedded in a computer readable medium, and/or encoded logic incorporated in hardware or otherwise stored (e.g., firmware). In particular embodiments, memory 213, 223, or 233 may include main memory for storing instructions for processor 211, 221, or 231, respectively, to execute or data for processor 211, 221, or 231 to operate on. In particular embodiments, one or more memory management units (MMUs) may reside between processor 211, 221, or 231 and memory 213, 223, or 233, respectively, and facilitate accesses to memory 213, 223, or 233 requested by processor 211, 221, or 231, respectively.

As an example and not by way of limitation, transmission site 108a, transmission site 108b, or endpoint 110 may load instructions from storage 215, 225, or 235, respectively, or another source (such as, for example, another computer system, another base station, or a remote transmission site) to memory 213, 223, or 233, respectively. Processor 211, 221, or 231 may then load the instructions from memory 213, 223, or 233, respectively, to an internal register or internal cache. To execute the instructions, processor 211, 221, or 231 may retrieve the instructions from the internal register or internal cache and decode them. During or after execution of the instructions, processor 211, 221, or 231 may write one or more results (which may be intermediate or final results) to the internal register or internal cache. Processor 211, 221, or 231 may then write one or more of those results to memory 213, 223, or 233, respectively. In particular embodiments, processor 211, 221, or 231 may execute only instructions in one or more internal registers or internal caches or in memory 213, 223, or 233, respectively (as opposed to storage 215, 225, or 235, respectively, or elsewhere) and may operate only on data in one or more internal registers or internal caches or in memory 213, 223, or 233, respectively (as opposed to storage 215, 225, or 235, respectively, or elsewhere). As mentioned above, memories 213, 223, and 233 may include a codebook generated according to present disclosure as detailed below with respect to FIG. 3.

In particular embodiments, storage 215, 225, or 235 may include mass storage for data or instructions. As an example and not by way of limitation, storage 215, 225, or 235 may include a hard disk drive (HDD), a floppy disk drive, flash memory, an optical disc, a magneto-optical disc, magnetic tape, or a Universal Serial Bus (USB) drive or a combination of two or more of these. Storage 215, 225, or 235 may include removable or non-removable (or fixed) media, where appropriate. Storage 215, 225, or 235 may be internal or external to transmission site 108, where appropriate. In particular embodiments, storage 215, 225, or 235 may be non-volatile, solid-state memory. In particular embodiments, storage 215, 225, or 235 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 215, 225, or 235 may take any suitable physical form and may comprise any suitable number or type of storage. Storage 215, 225, or 235 may include one or more storage control units facilitating communication between processor 211, 221, or 231, respectively, and storage 215, 225, or 235, respectively, where appropriate. In some embodiments, storage 215, 225, and 235 As may include a codebook generated according to present disclosure as detailed below with respect to FIG. 3.

In particular embodiments, interface 217, 227, or 237 may include hardware, encoded software, or both providing one or more interfaces for communication (such as, for example, packet-based communication) between transmission sites 108, endpoints 110, any networks, any network devices, and/or any other computer systems. As an example and not by way of limitation, communication interface 217, 227, or 237 may include a network interface controller (NIC) or network adapter for communicating with an Ethernet or other wire-based network and/or a wireless NIC (WNIC) or wireless adapter for communicating with a wireless network.

In some embodiments, interface 217 or 227 comprises one or more radios coupled to one or more antenna ports 116. In such an embodiment, interface 217 or 227 receives digital data that is to be sent out to wireless devices, such as endpoints 110, via a wireless connection. The radio may convert the digital data into a radio signal having the appropriate center frequency, bandwidth parameters, and transmission power. Similarly, the radios may convert radio signals received via one or more receiving antennas into digital data to be processed by, for example, processor 211 or 221, respectively. Interface 237 of endpoint 110 may be configured to perform similar operations via processor 231 and antenna port 118.

Depending on the embodiment, interface 217, 227, or 237 may be any type of interface suitable for any type of network for which antenna system 200 is used. As an example and not by way of limitation, antenna system 200 may communicate with an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, antenna system 200 may communicate with a wireless PAN (WPAN) (such as, for example, a BLUETOOTH WPAN), a WI-FI network, a WI-MAX network, an LTE network, an LTE-A network, a cellular telephone network (such as, for example, a Global System for Mobile Communications (GSM) network), or any other suitable wireless network or a combination of two or more of these. Transmission site 108a, transmission site 108b, and endpoint 110 may include any suitable interface 217, 227, or 237, respectively, for any one or more of these networks, where appropriate.

In some embodiments, interface 217, 227, or 237 may include one or more interfaces for one or more I/O devices. One or more of these I/O devices may enable communication between a person and a transmission site 108 and/or endpoint 110. As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. Particular embodiments may include any suitable type and/or number of I/O devices and any suitable type and/or number of interfaces 217, 227, or 237 for them. Where appropriate, interface 217, 227, or 237 may include one or more drivers enabling processor 211, 221, or 231, respectively to drive one or more of these I/O devices. Interface 217, 227, or 237 may include one or more interfaces 217, 227, or 237, respectively, where appropriate.

Bus 212, 222, or 232 may include any combination of hardware, software embedded in a computer readable medium, and/or encoded logic incorporated in hardware or otherwise stored (e.g., firmware) to couple components of a transmission site 108 or endpoint 110 to each other. As an example and not by way of limitation, bus 212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 212, 222, or 232 may include any number, type, and/or configuration of buses 212, 222, or 232, where appropriate. In particular embodiments, one or more buses 212, 222, or 232 (which may each include an address bus and a data bus) may couple processor 211, 221, or 231, respectively, to memory 213, 223, or 233, respectively. Bus 212, 222, or 232 may include one or more memory buses.

Herein, reference to a computer-readable storage medium encompasses one or more tangible computer-readable storage media possessing structures. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of processor 211, 221, or 231 (such as, for example, one or more internal registers or caches), one or more portions of memory 213, 223, or 233, one or more portions of storage 215, 225, or 235, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Perl, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

Accordingly, the above mentioned components of transmission sites 108 and endpoint 110 may enable transmission sites 108 and endpoint 110 to perform operations such as joint DL transmission according to the present disclosure. Additionally, such components may allow for the use of a codebook generated in accordance with the present disclosure to help facilitate the joint DL transmission.

Modifications, additions, or omissions may be made to FIG. 2 without departing from the scope of the present disclosure. For example, any of the options or features described herein may be utilized in combination with the illustrated embodiments of FIGURE and 2 and/or any number of the other options or features also described herein as would be understood by one of ordinary skill in the art.

Figure 3:
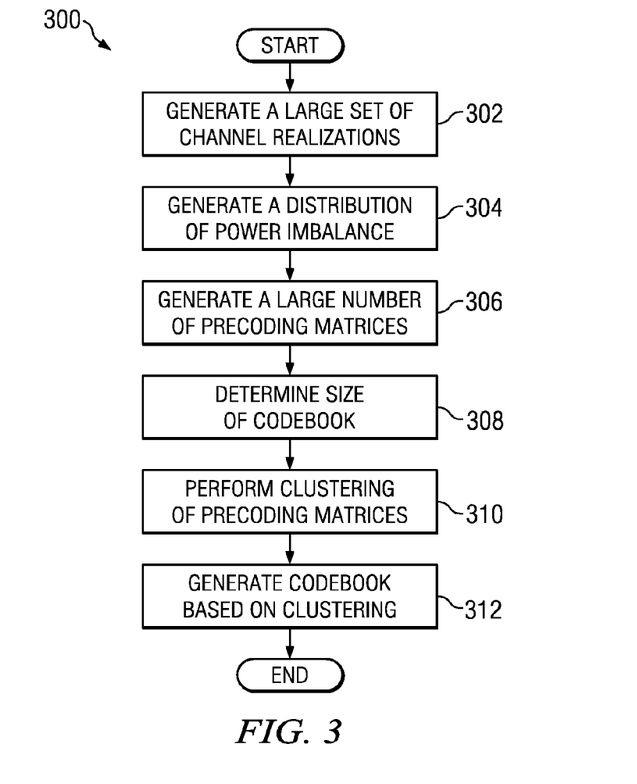
FIG. 3 depicts an example method for generating a global codebook that may be used with the antenna system of FIG. 1.
Figure 4:
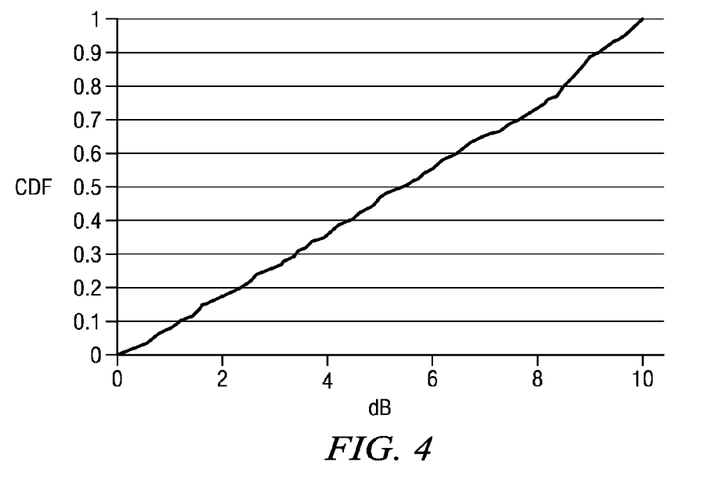
FIG. 4 illustrates a cumulative distribution function of power of wireless communication channels.

FIG. 3 illustrates and example method 300 for generating a codebook that facilitates joint DL transmission in accordance with some embodiments of the present disclosure. Method 300 may be performed using any suitable system, apparatus or device. For example, logic embodied in one or more computer readable storage media may be configured to perform the steps of method 300 when executed by a processor. In some embodiments, a wireless network administrator may direct a processor to execute method 300 to generate a codebook in accordance with the present embodiment. The network administrator may then communicate the codebook to applicable transmission sites and endpoints.

As described in detail below, a codebook for joint DL transmissions between a plurality of transmission sites (e.g., transmission sites 108a and 108b of FIGS. 1 and 2) and an endpoint (e.g., endpoint 110 of FIGS. 1 and 2) may be generated using a data mining and clustering scheme. Such a codebook may be used for a large distribution of channels ($H_k$) from a transmission site to an endpoint, where the respective channels between different transmission sites to the endpoint may have a wide range of power imbalances between them. Additionally, generating a codebook using clustering may reduce and/or minimize the expected chordal distance between an optimal precoding matrix for any given composite channel and the precoding matrices that are included in the codebook.

Method 300 may start, and at step 302 a large set (HS) of channel realizations between a transmission site and an endpoint may be generated. Each channel realization may be generated to represent different effects (e.g., pathloss) that may be experienced by wireless signals based on varying differences between transmission paths between the transmission site and the endpoint. The channel realizations may be determined based on any suitable channel distribution model. For example, a MIMO channel from a transmission site to an endpoint may follow a distribution based on a Spatial Channel Model Extended (SCME) distribution such that the set of channel realizations may be generated based on the SCME distribution.

The channel distribution may be based on a variety of factors including the number of antennas at a transmission site and the number of antennas at an endpoint. Therefore, the specific configuration of and number of different channel realization sets (HS) may vary depending on the transmission sites and endpoints for which a codebook may be generated. For example, if all the transmission sites have the same number of antennas and the endpoints also have the same number of antennas, one channel realization set may be generated. In contrast, if some transmission sites have different numbers of antennas and some endpoints also have different numbers of antennas, different channel realization sets may be generated to account for all the different permutations.

At step 304, a power distribution imbalance for the network simulated at step 302 may be generated. As mentioned above, the path from an endpoint to different transmission sites may vary because of the differences in the transmission paths. Accordingly, the different channels may have power differences and the relationship may be expressed mathematically. As an example, the distribution of power difference between channels 124a ($H_0$) and 124b ($H_1$) may be expressed as the following function: $\|H_0\|^2_{fro} = \alpha^2 \|H_1\|^2_{fro}$, where $\alpha$ represents the power difference. The power difference between channels may follow a cumulative distribution function ($f(a)$), such as that shown in FIG. 4. Therefore, in some embodiments, power distribution function ($f(a)$) such as that shown in FIG. 4 may be generated at step 304.

At step 306, a large number of composite precoding matrices may be generated based on the channel realization set(s) (HS) generated at step 302 and the power distribution function generated at step 304. For example, a channel representation ($H_x$) may be randomly selected from an appropriate channel realization set (HS) to represent a channel between a first transmission site and an endpoint. The channel realization set (HS) from which $H_x$ may be chosen may be a set that corresponds with the transmission site and the endpoint transmissions. For example, if the transmission site has four antenna ports and the endpoint has two antenna ports, $H_x$ may be selected from a channel realization set generated for MIMO transmissions where the transmission site has four antenna ports and the endpoint has two antenna ports. Additionally, another channel representation ($H_y$) may be randomly selected from an appropriate channel realization set (HS) to represent a channel between a second transmission site and the endpoint. In some embodiments where the antenna configuration of the two transmission sites is the same (e.g., both transmission sites have four antenna ports), $H_x$ and $H_y$ may be selected from the same channel realization set (HS). If the antenna configuration of the two transmission sites is different (e.g., the first transmission site has four antenna ports and the second has three antenna ports), $H_x$ and $H_y$ may be selected from different channel realization sets (HS).

Additionally, at step 306, a power imbalance (a) may be randomly selected from $f(a)$ generated at step 304. The randomly selected power imbalance may be applied to one of $H_x$ and $H_y$ to model a power imbalance between the channels represented by $H_x$ and $H_y$. Additionally, a phase shift may be applied to one of $H_x$ and $H_y$ to model phase differences between the channels represented by $H_x$ and $H_y$. After the phase and power modifications have been made to one of $H_x$ and $H_y$, a composite channel H including both $H_x$ and $H_y$ may be generated. A composite precoding matrix W for the composite channel H may be determined by taking the right square value of the composite matrix H, as described above. Additionally, the size of the composite precoding matrix may be determined and based on the transmission rank that may be used for composite channel H. For example, the number of columns of the composite precoding matrix may correspond with the transmission rank (e.g., a precoding matrix having four columns may be generated based on a transmission rank of four).

This process may be repeated many times to generate a large sample of composite precoding matrices for a large number of different composite channels to effectively model joint DL transmission between two transmission sites. For example, this process may be done over ten thousand times in some embodiments.

The generation of different precoding matrices may be accomplished using any suitable processing system configured to run an algorithm. For example, the following algorithm may be run to produce a large number of precoding matrices for joint DL transmission between two transmission sites and an endpoint where the two transmission sites have the same antenna configuration:

For i=1:N, (where $N>10^5$)
$H_x^i$:=randomly choosen from channel set (HS);
$H_y^i$:=randomly choosen from channel set (HS);
$\alpha^i$:=randomly generated following $f(\alpha)$
$\theta$:=randomly generated from $[0, 2\pi]$
$H=[H_x^i \alpha^i e^{j\Theta} H_y^i]$
$W_i$=rsv(H)
End.

Accordingly, a large number of composite precoding matrices may be generated at step 306, where at least a subset of the composite precoding matrices may be included in a codebook, as detailed with respect to steps 308, 310 and 312 below. Although step 306 is described as generating precoding matrices for joint DL transmission that includes two transmission sites, modifications may be made to step 306 to generate composite precoding matrices for DL transmission that includes more than two transmission sites. For example, an extra step may be included to randomly choose a third channel realization ($H_z$) from an appropriate channel realization set (HS) to represent a channel between a third transmission site and the endpoint. Accordingly, phase and power adjustments may also be made to the third channel realization ($H_z$) and the composite channel (H) may include the elements of ($H_z$) also.

At step 308, the number of codewords (precoding matrices) to be included in the codebook may be chosen such that the size of the codebook may be selected. The number of codewords included in a codebook may be based on a variety of factors including how much information may be transmitted by the feedback overhead in the signals transmitted from the endpoint to the transmission sites indicating which codeword to use. For example, if the feedback overhead is only four bits long, the size of the codebook may be limited to sixteen codewords. As another example, if the size of the feedback overhead is eight bits, the size of the codebook may include two hundred fifty-six codewords.

At step 310, a clustering algorithm may be performed on the large number of precoding matrices based on the size of the codebook selected at step 308. For example, if the codebook size is sixteen, a clustering algorithm may be performed to select sixteen precoding matrices that may collectively approximate the distribution of the large number of precoding matrices generated at step 306.

In some embodiments, the precoding matrices may be selected for the codebook by using a generalized Lloyd's algorithm. Lloyd's algorithm may begin by partitioning the large number of composite precoding matrices determined at step 306 into K initial sets that are randomly selected, where K represents the size of the codebook. The average point, or centroid of each set of precoding matrices may then be determined. Once the centroid is determined, K new partitions may be generated by associating each precoding matrix with the centroid to which it is closest. Then, new centroids for the new clusters may be determined. This process may be repeated until there is convergence among the precoding matrices in which the precoding matrices no longer switch clusters after performing the above steps. Therefore, the centroids of the last clusters may represent the overall distribution of the large number of precoding matrices. Such a configuration may reduce and/or minimize the chordal distance between each of the precoding matrices in the large set of precoding matrices and one of the centroid precoding matrices.

Below is an example application of Lloyd's algorithm that may be used to determine the centroids of a large set of precoding matrices (W):

Initialization
n=0;
Randomly choose K entries from W as $\{W_1^{(0)}, \ldots, W_k^{(0)}\}$
Clustering

```
Do {
  For ∀W_i ∈ W, c_i^(n) = arg min_{1≤k≤K} d_c(W_i, W_k^(n));
  Cluster C_k^(n) = {W_i, c_i^(n) = k};
  For 0 ≤ k ≤ K, W_k^(n+1) = centroid(C_k^(n));
  CB^(n+1) = {W_k^(n+1), 1 ≤ k ≤ K}
  n = n + 1;
} until {CB^(n) converges}
Output CB^(n) as codebook CB_{T,K} of rank T, size K.
```

The codeword distance $d_c(W_1, W_2)$ shown above may be determined by the following expression:

$$d_c(W_1, W_2) = \text{sqrt}(M - \text{trace}(W_1 W_1^H W_2 W_2^H))$$

Additionally, the centroid calculation (clustering) may be performed using the following expressions:

$$D^2(W, C_k^{(n)}) = \sum_{W_k \in C_k^{(n)}} d_c^2(W, W_k) = \sum_{W_k \in C_k^{(n)}} (M - \text{trace}(WW^H W_k W_k^H)),$$

$$W^* = \text{centroid}(C_k^{(n)}) = \arg\min_W(D^2(W, C_k^{(n)})),$$
$$s.t. W^H W = I_T.$$

$$W^* = \arg\max_W(W^H S W), s.t. W^H W = I_T.$$

$$S = \frac{1}{|C_k^{(n)}|} \sum_{W_k \in C_k^{(n)}} W_k W_k^H.$$

S is positive semidefinte (psd).
Let ordered eigen value decomposition of S be:

$$S = U_S \text{diag}(|\sigma_1|^2, |\sigma_2|^2, \ldots, |\sigma_M|^2) U_S^H, |\sigma_1|^2 \geq |\sigma_2|^2 \geq \ldots \geq |\sigma_M|^2.$$

$U_S^{[T]}$: first T columns of $U_S$.
$W^* = U_S^{[T]}$

At step 312, the centroids of the last clusters may be selected as the codewords (precoding matrices) that are to be included in the codebook, and the codebook may accordingly be generated. Following step 312, method 300 may end. Therefore, a codebook may be generated according to method 300 to select precoding matrices that may reduce and/or minimize the chordal distance between an optimal precoding matrix for a particular composite channel and one of the precoding matrices included in the codebook. As such, the codebook generated in accordance with the present disclosure may improve the quality of joint DL transmission between a plurality of transmission sites and an endpoint.

Modifications, additions, or omissions may be made to method 300 without departing from the scope of the present disclosure. For example, the specific order of operations of the steps described above may be different than the order described, and some steps may be performed simultaneously. Also, method 300 is described with respect to certain situations and algorithms, which may be modified according to specific network parameters. Additionally, in some embodiments a codebook may be generated for a particular transmission rank and a reduced rank codebook may be generated from the higher ranking codebook. For example, to generate a codebook $CB_t$, having a transmission rank t from a codebook $CB_T$ having a higher transmission rank T, the first t columns of each codeword in $CB_T$ may be used as the codewords in codebook $CB_t$.

Numerous other changes, substitutions, variations, alterations and modifications may be ascertained by those skilled in the art and it is intended that particular embodiments encompass all such changes, substitutions, variations, alterations and modifications as falling within the spirit and scope of the appended claims.

What is claimed:

1. A method for generating a codebook comprising:
    using a processor, generating a plurality of wireless communication channel representations, wherein generating the plurality of wireless communication channel representations comprises:
        determining a first wireless communication channel representation associated with downlink (DL) communication between a first transmission site and an endpoint;
        determining a second wireless communication channel representation associated with DL communication between a second transmission site and the endpoint; and
        combining the first wireless communication channel representation with the second wireless communication channel representation to form a composite wireless communication channel representation associated with a joint DL communication between the endpoint and the first transmission site and the second transmission site;
    using the processor, generating a precoding matrix for each of the plurality of wireless communication channel representations;
    using the processor, performing a clustering operation on the precoding matrices to determine a plurality of centroids associated with the precoding matrices;
    using the processor, determining codewords based on the centroids;
    using the processor, generating a codebook based on the codewords; and
    transmitting the codebook to at least one of the first transmission site and the second transmission site for use in communications with the endpoint.

2. The method of claim 1, wherein performing the clustering operation comprises performing a generalized Lloyd's algorithm.

3. The method of claim 1, further comprising determining a size of the codebook and determining a number of centroids based on the size of the codebook.

4. The method of claim 1, further comprising applying a power distribution function to the second wireless communication channel representation.

5. The method of claim 1, further comprising applying a phase shift to the second wireless communication channel representation.

6. The method of claim 1, wherein the first wireless communication channel representation and the second wireless communication channel representation are uncorrelated.

7. The method of claim 1, wherein generating the plurality of wireless communication channel representations comprises generating a multiple input/multiple output (MIMO)

wireless communication channel representation for each of the plurality of wireless communication channel representations.

8. The method of claim 1, wherein generating the plurality of wireless communication channel representations comprises generating at least ten thousand wireless communication channel representations.

9. The method of claim 1, further comprising generating a channel realization set based on a Spatial Channel Model Extended (SCME) distribution and wherein generating the plurality of wireless communication channel representations is based on the channel realization set.

10. One or more non-transitory computer-readable media embodying logic that, when executed by a processor, is configured to perform operations comprising:
- generating a plurality of wireless communication channel representations, wherein generating the plurality of wireless communication channel representations comprises:
  - determining a first wireless communication channel representation associated with downlink (DL) communication between a first transmission site and an endpoint;
  - determining a second wireless communication channel representation associated with DL communication between a second transmission site and the endpoint; and
  - combining the first wireless communication channel representation with the second wireless communication channel representation to form a composite wireless communication channel representation associated with a joint DL communication between the endpoint and the first transmission site and the second transmission site;
- generating a precoding matrix for each of the plurality of wireless communication channel representations;
- performing a clustering operation on the precoding matrices to determine a plurality of centroids associated with the precoding matrices;
- determining codewords based on the centroids;
- generating a codebook based on the codewords; and
- transmitting the codebook to at least one of the first transmission site and the second transmission site for use in communications with the endpoint.

11. The one or more media of claim 10, wherein performing the clustering operation comprises performing a generalized Lloyd's algorithm.

12. The one or more media of claim 10, wherein the logic is further configured to perform operations comprising determining a size of the codebook and determining a number of centroids based on the size of the codebook.

13. The one or more media of claim 10, wherein the logic is further configured to perform operations comprising applying a power distribution function to the second wireless communication channel representation.

14. The one or more media of claim 10, wherein the logic is further configured to perform operations comprising applying a phase shift to the second wireless communication channel representation.

15. The one or more media of claim 10, wherein the first wireless communication channel representation and the second wireless communication channel representation are uncorrelated.

16. The one or more media of claim 10, wherein generating the plurality of wireless communication channel representations comprises generating a multiple input/multiple output (MIMO) wireless communication channel representation for each of the plurality of wireless communication channel representations.

17. The one or more media of claim 10, wherein generating the plurality of wireless communication channel representations comprises generating at least ten thousand wireless communication channel representations.

18. The one or more media of claim 10, wherein the logic is further configured to perform operations comprising generating a channel realization set based on a Spatial Channel Model Extended (SCME) distribution and wherein generating the plurality of wireless communication channel representations is based on the channel realization set.

* * * * *

UNITED STATES PATENT AND TRADEMARK OFFICE
CERTIFICATE OF CORRECTION

PATENT NO. : 8,711,969 B2  
APPLICATION NO. : 13/485029  
DATED : April 29, 2014  
INVENTOR(S) : Chenxi Zhu et al.

Page 1 of 1

It is certified that error appears in the above-identified patent and that said Letters Patent is hereby corrected as shown below:

On the Title Page, Item (54) and in the Specification, Column 1, Line 1:

Before "Global" insert -- Design of a --.

Signed and Sealed this
Fourteenth Day of October, 2014

Michelle K. Lee
*Deputy Director of the United States Patent and Trademark Office*